United States Patent [19]

Shibata et al.

[11] 4,025,860
[45] May 24, 1977

[54] CONTROL SYSTEM FOR BATTERY HYBRID SYSTEM

[75] Inventors: Takanori Shibata; Tsutomu Omae, both of Hitachi, Japan

[73] Assignee: Agency of Industrial Science & Technology, Tokyo, Japan

[22] Filed: Sept. 15, 1975

[21] Appl. No.: 613,199

[30] Foreign Application Priority Data

Sept. 14, 1974  Japan .......................... 49-105539

[52] U.S. Cl. ...................................... 320/3; 320/6;
 320/9; 320/15; 318/139; 180/65 R
[51] Int. Cl.[2] ...................... H02J 7/00; H02P 1/00
[58] Field of Search .................................. 320/2-5,
 320/6, 9, 10, 61, 15, 39; 180/65; 318/139

[56] References Cited

UNITED STATES PATENTS

| | | | |
|---|---|---|---|
| 2,818,543 | 12/1957 | Dodge | 320/3 |
| 3,443,115 | 5/1969 | Timmerman, Jr. | 320/3 X |
| 3,686,549 | 8/1972 | Winebrener | 318/139 |
| 3,823,358 | 7/1974 | Rey | 320/3 |

*Primary Examiner*—Robert J. Hickey
*Attorney, Agent, or Firm*—Beall & Jeffery

[57] ABSTRACT

An electric auto power supply has an energy battery which is capable of discharging a current for a comparatively long period of time and high in energy density, and a power battery which is capable of discharging a current of a comparatively high amperage and high in power density. The energy battery and the power battery are connected respectively by way of switching means in parallel relation to each other, so as to be used as a power source of an electromobile. The current discharged from these batteries is controlled, such that a current required for the travelling of the electromobile, which is dependent upon the travelling conditions thereof, is supplied simultaneously from both batteries, or separately from individual batteries, or otherwise only from one battery, while a current is being charged to the other battery, thus extending the possible mileage range of the electromobile.

11 Claims, 11 Drawing Figures

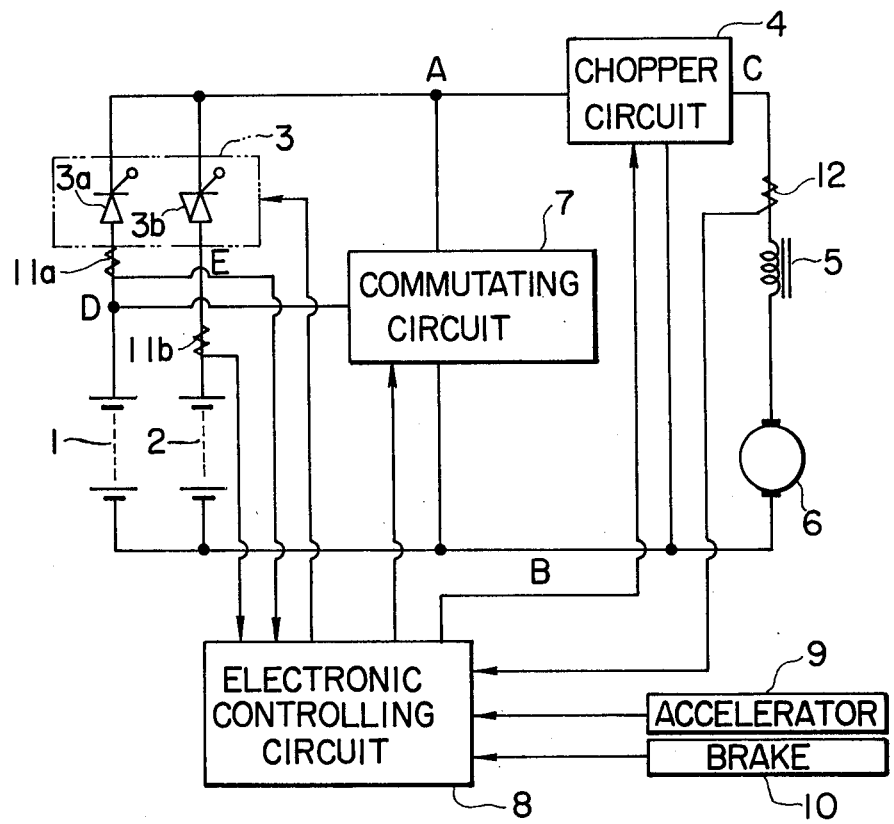
FIG. 3
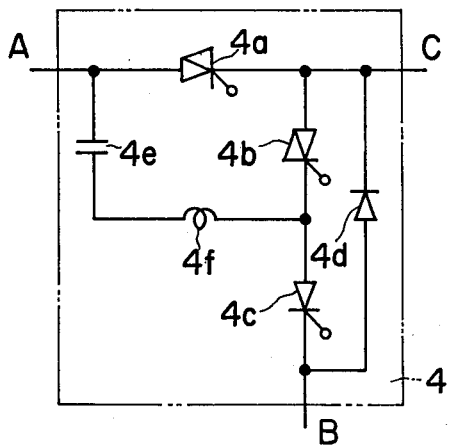
FIG. 4
FIG. 5

CONTROL SYSTEM FOR BATTERY HYBRID SYSTEM

BACKGROUND OF THE INVENTION

This invention relates to a control system for a battery hybrid system, in which two types of batteries having different characteristics are used as power sources for an electromobile.

In most electromobiles, a lead battery has hitherto been used as a power source. This is because a lead battery is comparatively inexpensive and which is capable of discharging a large amount of current for a short period of time, upon acceleration of a electromobile. The lead battery, however, presents insufficiently high energy density (Wh/kg) to give an acceptably large mileage range to an electromobile. The five-hour term dicharge capacity of the lead battery, in general, ranges from 40 to 50 Wh/kg. An electromobile is therefore short in a possible mileage range, as compared with a gasoline motor vehicle of the same class, and this has been an obstacle in the practical use of the electromobile. In this connection, if the weight of the battery is increased for increasing a weight ratio of the battery to the vehicle, then the possible mileage range of the electromobile could be extended. This, however, results in the increase in the weight of an electromobile itself, thereby lowering the loading capability as well as lowering the performance of the electromobile.

On the other hand, the five-hour-term discharge capacity of a zinc-air battery or an iron-air battery ranges from 80 to 130 Wh/kg, which is twice as high as that of the lead battery. Such a battery, however, is not suited for an electromobile, because of its inability to discharge a large amount of current.

SUMMARY OF THE INVENTION

It is accordingly an object of the present invention to provide a control system for a battery hybrid system, wherein two types of batteries are used in combination for providing a power source system suited for an electromobile, one battery being high in energy density as in a zinc-air battery or an iron-air battery but unable to discharge a large amount of current (hereinafter referred to as an energy battery), and the other battery being capable to discharging a large amount of current as in a lead battery or a nickel-cadmium battery, but having lower energy density (hereinafter referred to as a power battery); and the characteristics of individual batteries being utilized to the fullest extent by controlling the discharge currents from the energy battery as well as from the power battery, thereby satisfying the various requirements for an electromobile and extending a possible mileage range thereof.

According to the present invention, a control system for a battery hybrid system is characterized in that two types of batteries of different characteristics, such as an energy battery and a power battery, are provided and respective batteries are controlled in a manner that the energy battery is used in a small current discharging range and the power battery is used in a large current discharging range thereby efficiently extracting energy from the individual batteries.

BRIEF DESCRIPTION OF THE DRAWINGS

FIG. 3 is a block diagram of a control circuit of an electric motor, according to a preferred embodiment of the present invention;

FIG. 4 is an example of a chopper circuit;

FIG. 5 is an embodiment of a forced commutating circuit of thyristors for use in switching current from batteries used in the present invention;

DETAILED DESCRIPTION OF THE PREFERRED EMBODIMENT

Figure 1:
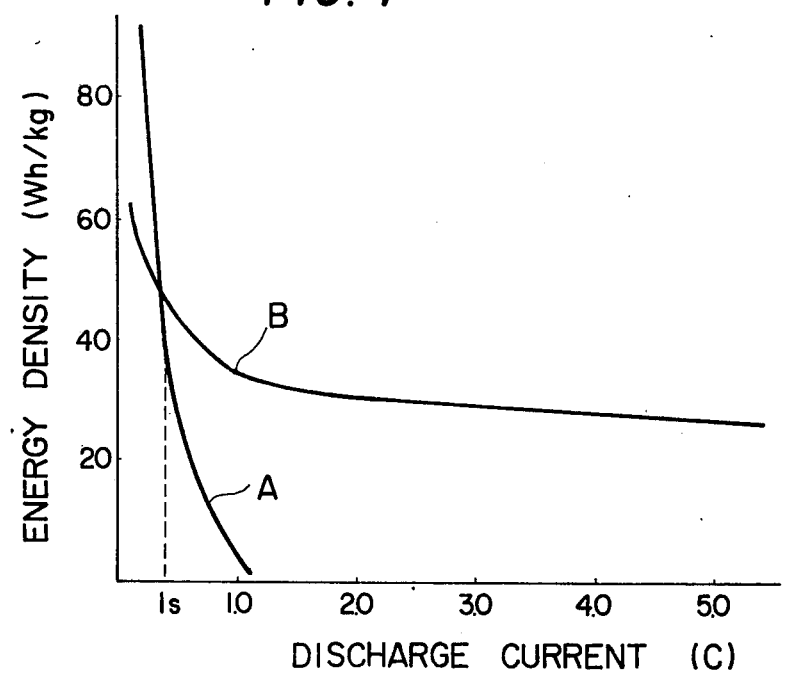
FIG. 1 plots energy density versus discharge current typical energy battery and power battery.
Figure 2:
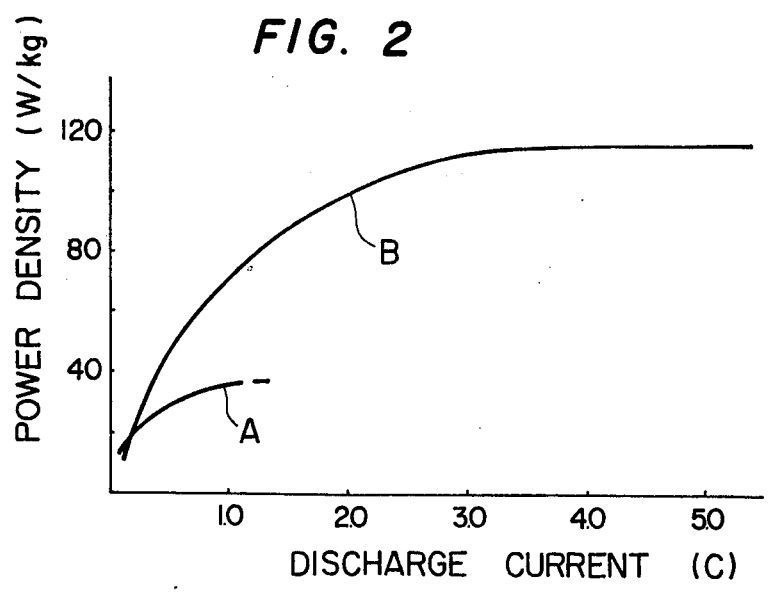
FIG. 2 is a plot representing power density versus discharge current of the above batteries.

FIG. 1 is a plot of a characteristic of energy density (W/kg) versus discharge current (C), of an energy battery A and a power battery B. The plot shows that if a limitation is placed on the use of discharge current, then high energy for a predetermined weight of the battery may be extracted from the energy battery. Likewise, FIG. 2 shows a plot of a characteristic of power density (Wlkg) versus dicharge current of the energy battery A and the power battery B. As is apparent from FIGS. 1 and 2, it should be desirable that, in small current discharging range, current is discharged from the energy battery, while in a large current discharging range, current be discharged from the power battery. Where it is desired to discharge current of an amount more than that at the reference point $I_S$ at which both batteries are equal in energy density, then such an amount of current should be discharged from the power battery.

An effective discharge current of the energy battery may be selected as that at a point, besides the reference point $I_S$, at which the energy of both batteries is efficiently utilized, according to the weight (capacity) distribution of the batteries, although it depends upon the load condition, so that a possible mileage may be extended.

According to the present invention, there is provided a battery hybrid control system, wherein batteries of a dual system which are different in characteristics are provided as a power source; and one battery is high in energy density and used for discharging in a small current discharging range, while the other battery is high in power density and used for the discharging in a large current discharging range, whereby the various requirements for performance of an electromobile are satisfied, as well as energy of respective batteries is efficiently extracted therefrom, thereby extending a possible mileage.

Referring to FIG. 3, there is shown a preferred embodiment of the present invention. Shown at 1 is an energy battery such as a zinc-air battery or an iron-air battery, at 2 a power battery such as a lead battery, or a nickel-cadmium battery, at 3 a battery-current switching control circuit, and at 3a and 3b switching elements. Shown at 4 is a chopper circuit, at 5 a smoothing DC reactor, at 6 an electric motor, at 7 a commutating circuit connected to thyristors in the battery-current-switching-control-circuit, at 8 an electronic controlling circuit for applying an ignition pulse required to respective thyristors in the chopper circuit or in the battery-current switching circuit, according to a control command from an accelerator 9 or from a brake device 10, thereby controlling the running of the electric motor, at 11a and 11b battery-current sensors, and at 12 a motor-current sensor. The construction of the chopper circuit 4 and the commutating circuit 7 for the battery-current switching thyristors are shown in FIGS. 4 and 5. Referring first to FIG. 4, shown at 4a is a reverse-conductive type thyristor which is adapted to be actuated as a main thyristor at the time of the heavy-load running and actuated as a commutating thyristor at the time of the braking action, and at 4b a reverse-conductive type thyristor adapted to be actuated as a main thyristor at the time of application of the braking action and adapted to be actuated as a commutating thyristor at the time of the heavy-load running. Shown at 4c is a reverse flow-blocking type thyristor which is used for charging the commutating thyristor as well as serving as a main thyristor at the time of braking action, at 4d a fly-wheel diode, and at 4f a commutating reactor. Referring to FIG. 5, shown at 7a is a commutating, reverse-conductive type thyristor, at 7b a diode for supplementarily supplying a current to a commutating condenser 7d, at 7c a current-supplementing resistor, and 7e a commutating reactor.

The principle of operation of the chopper circuit will be referred to in conjunction with FIGS. 3 and 4. The explanation will commence with the heavy-load running. At least one of the thyristors 3a and 3b and the thyristor 4c are ignited, thereby charging current from the battery 1 or 2 through the commutating reactor 4f to the commutating condenser 4e. Upon the termination of the charging to the condenser 4e, the respective thyristors will be turned off by itself. Subsequently, when either the element 3a or the element 3b and the main thyristor 4a are turned on in synchronism, then the terminal voltage of the battery will appear across the output terminals C and B of the chopper, whereby the motor current is allowed to flow. The motor current increases according to a circuit time-constant. If, after a given interval of time, the thyristor 4b is turned on, then the electric charge in the commutating condenser 4e will be discharged through the thyristor 4a and the reactor 4f, whereby the condenser current is reversed due to resonance in the reactor and the condenser, and the normal directional current in the thyristors 4a and 4b is offset, thus turning off these thyristors. The condenser current is charged through the reverse-directional diodes 4a and 4b to the condenser, thus imparting the initial polarity thereto. The motor current is fed toward the flywheel diode 4d and attenuates according to a circuit time-constant.

Thereafter, the cycle of operations described is repeated. If the turning-on interval and turning-on frequency of the pulse is changed, the current conducting ratio in the chopper may be controlled, and thereby the motor current as well as the motor speed may be controlled. The current conductng ratio is controlled by the control circuit 8. Upon the braking action, following the charging to the commutating condenser in a like manner, the thyristors 4b and 4c are simultaneously turned on. Then the motor current will be caused to flow according to a circuit time-constant in a manner to increase short-circuiting circuits by way of the reactor 5. If, after a given interval of time, the thyristor 4a is caused to be turned on, then electricity charged in the condenser 4e will be discharged through 4b and 4f, and eventually respective thyristors will be turned off through the process the same as in the heavy-load running due to the resonant phenomenon in the chopper circuit. A back electromotive force which is given rise to by the reactor is superposed on the motor voltage, and a motor current is caused to flow as a regenerative current through the reverse-directional diode of the thyristor 4a to the battery. The cycle of operations described is thereafter repeated.

Figure 6:
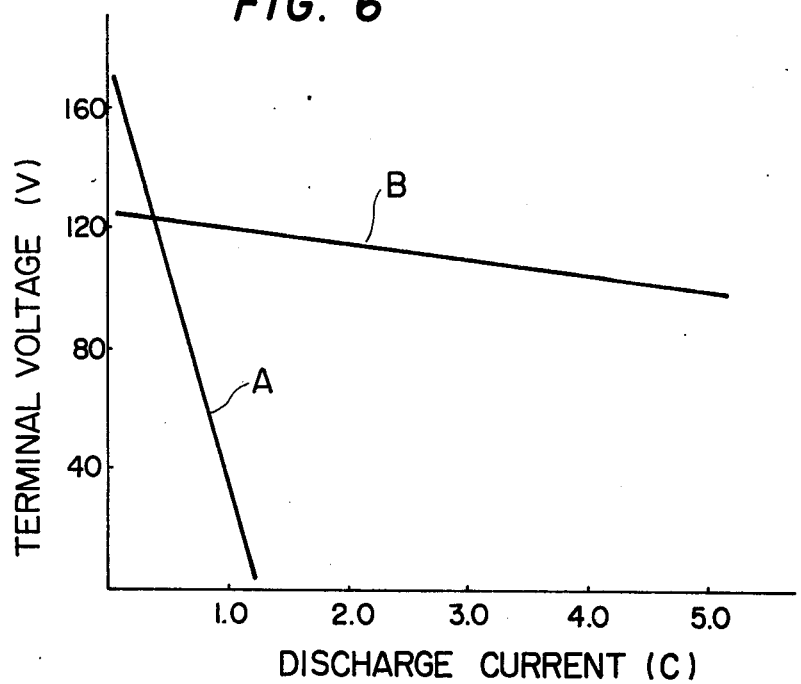
FIG. 6 plots a voltage drop characteristic versus discharge current of the typical energy battery and power battery.

The energy battery and the power battery in general, present a voltage drop characteristic, as plotted in FIG. 6, wherein the former is large in the internal resistance and hence presents a sharp voltage drop characteristic as represented by a line A, while the latter is slow in the voltage drop as represented by a line B, because of a small internal resistance. For this reason, the energy battery need be given an open-circuit voltage much higher than that of the power battery. Assuming that $V_{OA}$, $V_{OB}$ and $R_{OA}$, $R_{OB}$, are representative of the open-circuit voltage and the internal resistance of the energy battery and those of the power battery, respectively, and Is is the representative of an effective discharge current of the energy battery, then, $$\frac{V_{OA} - V_{OB}}{R_{OA} - R_{OB}} \approx Is \qquad (1)$$

Thus, the voltage of these batteries should desirably be determined to a level as high as that satisfying the above expression.

The energy battery is high in energy density, and the energy battery must be used within the limit of a discharge current which permits efficient extraction of energy from the battery, so that, in the range where the motor current is small, the thyristor 3a connected to the energy battery is caused to turn on in synchronism with the turning-on of the chopper so as to positively supply a current from the energy battery to the power battery. Where the discharge current from the energy battery exceeds the effective discharge current thereof as a result of an increase in motor current, then the thyristors 3a and 3b both are caused to turn on in synchronism with the turning-on of the chopper. If voltage drop and internal resistance in the thyristors are deemed as being included in the electromotive force and internal resistance of individual batteries, then the current distribution of the energy battery current 1A and the power battery current 1B is expressed as follows:

$$i_A = \frac{1}{R_{OA} + R_{OB}} [R_{OB} i_C + (R_{OA} - R_{OB}) I_Q] \qquad (2)$$

$$i_B = \frac{1}{R_{OA} + R_{OB}} [R_{OA} i_C + (R_{OB} - R_{OA}) I_Q] \qquad (3)$$

wherein $I_Q$ is:

$$I_Q = \frac{V_{OA} - V_{OB}}{R_{OA} - R_{OB}} \qquad (4)$$

Where and $i_C$ is an input current to the chopper, which is represented by: $i_A$ $i_B$ $$i_C = i_A + i_B \qquad (5)$$

Assuming that $im$ is representative of the mean value of the motor current, and $\delta$ is representative of the current conducting ration in the chopper, then the relationship as expressed by the following equation will be established between the mean value $ic$ of the input current to the chopper and the mean value $im$ of the motor current.

$$i_C = i_A + i_B \qquad (6)$$

In the expression (2), when the motor current increases then $$i_A \geqq I_S \qquad (7)$$

Since it is undesirable that the discharge current from the energy battery exceeds a preset value of the effective discharge current of the energy battery, then the thyristor 7a is caused to turn on for a duration in which the thyristor 3a is conducting. On the other hand, electricity has been charged beforehand through the reactor 7e, diode 7b, and resistor 7c to the commutating condenser 7d. Thus, the electricity charged in the commutating condenser 7d is discharged through the thyristors 3a and 7a, and the normal-directional current across both thyristors will be off-set due to the resonant phenomenon which arises in the circuit, whereby the thyristor 3a is turned of, thereby blocking the discharge of current from the energy battery.

The motor current, which is required for the starting, accelerating or travelling on an upward road is extremely large and a heavy burden is imposed on the power battery, so that, during the interruption of the chopper or during a short stop of a vehicle, the power battery must be used, with the energy battery being charged, so as to avoid dissipation of energy of the power battery. To this end, immediately after the thyristor 3a has been rendered nonconductive, during the operation described, the thyristor 3a is again turned on, so that a current may be fed from the energy battery to the power battery. The current is given by the expression (4), according to a voltage difference between both batteries. Thus, the reverse directional diode of the thyristor 3b is rendered conductive, whereby the current is fed therethrough to the power battery. In case the thyristor 3a is conducting when the chopper becomes conductive, the thyristor 3a permits to flow the charging current to the power battery, without being turned off even if the chopper is rendered non-conductive. Thus, a turning-on pulse should not necessarily be given to the thyristor 3a. In case the thyristor 3a is non-conducting when the chopper is rendered conductive, then the thyristor 3a must be turned on after the chopper has been rendered non-conductive. The thyristor 3b is turned off by itself due to the interruption of the chopper.

Figure 7:
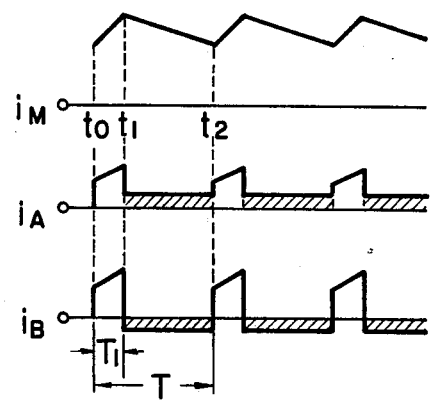
FIGS. 7 and 8 represent the wave forms, explaining the operation of the present invention.
Figure 8:
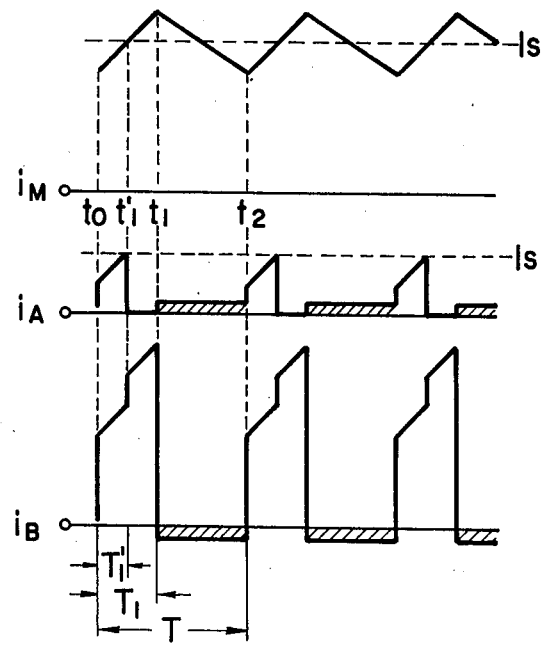

FIGS. 7 and 8 show the current wave form, illustrating the operations described. FIG. 7 shows the case where a motor current $iM$ is comparatively small; a vehicle is run by turning on the thyristors 3a and 3b simultaneously; and the discharge current $iA$ from the energy battery does not exceed the preset value $Is$ of the effective discharge current. Represented by $iB$ is the power battery current. If the chopper is rendered conductive at the time $t_0$ and interrupted at the time $t_1$, then the charging current (current shown by hatching) flows from the energy battery to the power battery for a duration from the interruption of the chopper until the chopper is again rendered conductive. Referring to FIG. 8, the motor current $iM$ is of a large amount; and the chopper is rendered conductive at the time $t_0$. Thus, the discharge current from the energy battery reaches the effective dicharge current at the time $t'_1$. Consequently, the thyristor 3a will be turned off. Then, the power battery current, $iB$ attends upon the motor current $iM$ hereby increasing current. If the chopper is rendered non-conductive at the time $t_1$ and in turn the thyristor 3a is turned on, then the charging current flows from the energy battery to the power battery. In FIGS. 7 and 8, the current conducting rate $\delta$ in the chopper is represented by the following expression:

$$\delta = T_1/T \qquad (8)$$

Also in the case where the chopper is maintained interrupted during a short stop of a vehicle, the thyristor 3a is turned on so that the charging current may be fed from the energy battery to the power battery.

At the time of the regenerative braking, it is effective to charge a large amount of current to the power battery which is high in the charging efficiency. To this end, a reverse-conductive type thyristor is employed for the thyristor 3b for switching the power battery current, so that the regenerative current may flow through the reverse-directional diode to the power battery, as shown in FIG. 3.

According to the present invention, energy of the energy battery having high energy density is effectively utilized for avoiding dissipation of energy of the power battery, so that a possible mileage of an electromobile may be extended without impairing the various performances thereof.

Figure 9:
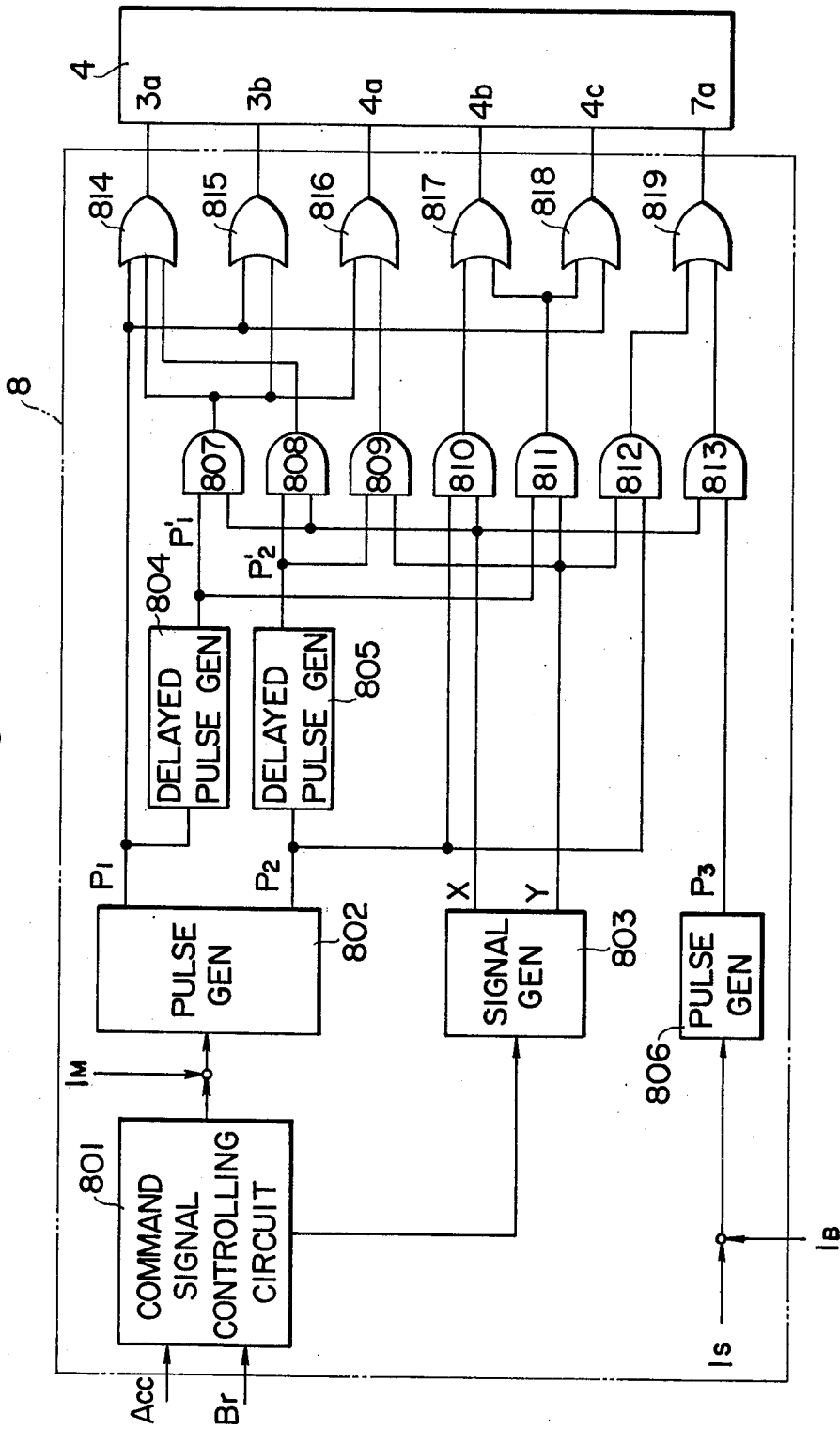
FIG. 9 is a block diagram showing in detail the construction of a control circuit available for the present invention.
Figures 10A, 10B:
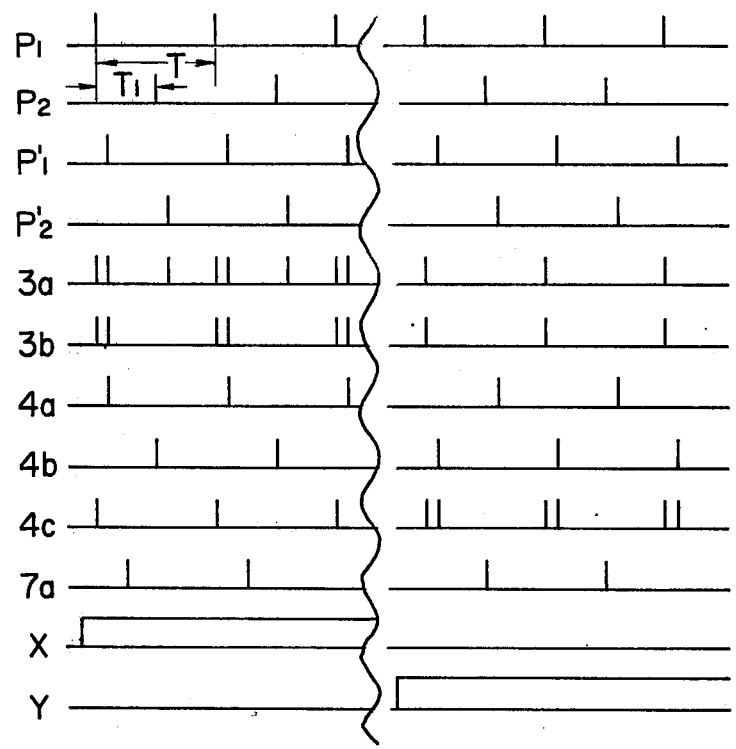
FIGS. 10a and 10b are pulse time charts explaining the operation of FIG. 9.

FIG. 9 is a block diagram showing in detail the construction of the control circuit as referred to FIG. 3, and FIG. 10 is a pulse time chart explaining the operation of the control circuit of FIG. 9. Referring to FIG. 9, shown at 801 is a command-signal controlling circuit, which is so arranged as to give a command signal for controlling a current conducting rate in the chopper, according to an output signal Acc from an accelerator 9 and an output signal Br from a brake device 10, and to determine the running mode such as a heavy-load running or the braking action, to thereby give a starting command to a pulse circuit. Designated 802 is a pulse generator, which is so arranged as to control the current conducting rate in the chopper, according to a deviation between the current-conducting-rate-command signal and the output from the motor current sensor 12, thereby producing pulses $P_1$ and $P_2$ as outputs. Shown at 803 is a running-mode-switching signal generator, which produces output signals X and Y according to the running mode such as the heavy-load running or the braking action, at 804 and 805 delayed pulse generators, which are provided for ensuring the time of operation for charging electricity to the commutating circuit for the thyristors and chopper, and at 806 a pulse generator, which compares the discharge current $I_B$ from the energy battery with the preset value $I_S$ of the proper discharge current of the energy battery, and produces a pulse signal if $I_S < I_B$. Designated 807 to 813 and 814 to 819 are logical circuits, which are indicated by positive logic and consist of AND gates and OR gates. The control circuit thus constructed operates in the manner shown in FIG. 10, in which reference ($a$) shows the heavy-load running and ($b$) shows the braking action. The current conducting rate $\delta$ in the chopper is represented by the following equation from the relationship of time between the pulses $P_1$ and $P_2$:

$$\delta = T_1/T \tag{8}$$

The current conducting rate is controlled by controlling the time $T_1$ and the pulse frequency $T$ to be repeated. The theoretical equations for operating the control circuit are as follows:

$$\begin{aligned}
3a &= P_1 + P'_1X + P'_2X \\
3b &= P_1 + P'_1X \\
4a &= P'_1X + P'_2Y \\
4b &= P_1X + P'_1Y \\
4c &= P_1 + P'_1Y \\
7a &= P_3 + P_2Y
\end{aligned} \tag{9}$$

According to the present invention, the energy battery high in energy density and the power battery having high power density are used in combination as a power source, so that the characteristic of the individual battery may be utilized to the fullest extent for the efficient use of respective batteries. This ensures an electromobile a high accelerating performance, a high capability of travelling an upward road and a high running performance at the maximum speed, as well as extension of the possible mileage of an electromobile.

In the embodiment shown, a zinc-air battery, etc., is used as an energy battery, but a fuel battery may be used although such a battery is rather disadvantageous when used for discharging a large current.

In the embodiment shown the effective discharge current $I_s$ of the energy battery is determined by a comparison with the discharge current of the power battery, but may be determined by taking other factors into account.

While a preferred embodiment of the present invention has been set forth in detail with various modifications mentioned and the details being important in their own right, further embodiments, modifications and variations are contemplated according to the broader aspects of the present invention, all as determined by the spirit and scope of the following claims.

What we claim 18:

1. A control system for a hybrid battery power source having at least one energy battery of high energy density capable of discharging a small current over a comparatively long period of time and at least one power battery of high power density capable of discharging at least momentarily a comparatively large current for supplying current to a variable load, said control system comprising: controllable switch means for selectively connecting only one and both of the energy and power batteries in parallel across the load; means for monitoring the discharge current from at least one of the energy and power batteries, and the load current through the load; said monitoring means providing respective output signals in dependence on said load and discharge currents; means for controlling said switch means in dependence on said output signals to cause said switch means to connect both said energy and power batteries in parallel across the load when said load current is smaller than a fixed level and the dicharge current from the energy battery is below a fixed level, and to connect only the power battery across the load when said load current is higher than a fixed level and the discharge current from the energy battery is at or above said predetermined level.

2. The control system of claim 1, wherein the energy battery has a greater terminal voltage than the power battery when said load current is reduced to zero and wherein said controlling means causes said switching means to connect the energy and power batteries in parallel when said load current is zero, thereby causing the energy battery of higher terminal voltage to charge the power battery of lower terminal voltage when said load current is zero.

3. The control system of claim 1, wherein the variable load means comprises chopper means in series connection with an electrical load, said chopper means alternating periods of connecting said switch means and power source to the load with periods of disconnecting said switch means and power source from the load to drop the load current to zero and recharge the power battery with the energy battery.

4. The control system of claim 3, wherein said chopper means is controllable for changing the relative length of alternating periods for correspondingly varying the current passing therethrough to the load.

5. The control system of claim 4 wherein said electrical load comprises the motor of an electrically powered vehicle having a hybrid battery power source and said control system is employed for controlling said power source, said control system further comprising manually operable means for providing variable acceleration and braking signals, and said controlling means being further connected for controlling said chopper in response to said acceleration and braking signals, thereby modifying the current through said motor in dependence on said acceleration and braking signals.

6. The control system of claim 5 wherein said controlling means is responsive to said signal means from said monitoring means, for connecting only the power battery across said motor during regenerative braking of said vehicle, thereby causing said power battery to be recharged.

7. The control system of claim 1, wherein said controllable switch means comprises controllable first and second switches each of which is connected in series with a respective one of the energy and power batteries.

8. The control system of claim 7, wherein at least one of said switches comprises a thyristor.

9. The control system of claim 8 wherein said controlling means further comprises commutating circuit means for opening the controllable switch connected in series with the energy battery when the discharge current of the energy battery reaches said predetermined level.

10. The control system of claim 7 wherein said controlling means further comprises commutating circuit means for opening the controllable switch connected in series with the energy battery when the discharge current of the energy battery reaches said predetermined level.

11. The control system of claim 1 wherein said electrical load comprises the motor of an electrically powered vehicle having a hybrid battery power source and said control system is employed for controlling said power source, said control system further comprising manually operable means for providing variable acceleration and braking signals, and said controlling means further modifying the current through said motor in dependence on said acceleration and braking signals.

* * * * *